(12) United States Patent
Han et al.

(10) Patent No.: US 12,118,176 B2
(45) Date of Patent: Oct. 15, 2024

(54) NOTIFICATION PROCESSING METHOD AND APPARATUS, TERMINAL, AND STORAGE MEDIUM

(71) Applicant: Huawei Technologies Co., Ltd., Shenzhen (CN)

(72) Inventors: Guohui Han, Shenzhen (CN); Bin Liu, Wuhan (CN); Bo Wang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/040,359

(22) PCT Filed: Aug. 2, 2021

(86) PCT No.: PCT/CN2021/109990
§ 371 (c)(1),
(2) Date: Feb. 2, 2023

(87) PCT Pub. No.: WO2022/028352
PCT Pub. Date: Feb. 10, 2022

(65) Prior Publication Data
US 2023/0359317 A1    Nov. 9, 2023

(30) Foreign Application Priority Data

Aug. 3, 2020  (CN) .......................... 202010768422.9
Jul. 30, 2021  (CN) .......................... 202110868907.X

(51) Int. Cl.
*G06F 3/0481* (2022.01)
*G06F 3/0484* (2022.01)
*G06F 3/0488* (2022.01)

(52) U.S. Cl.
CPC .......... *G06F 3/0481* (2013.01); *G06F 3/0484* (2013.01); *G06F 3/0488* (2013.01)

(58) Field of Classification Search
CPC ..... G06F 3/0481; G06F 3/0484; G06F 3/0488
See application file for complete search history.

(56) References Cited

U.S. PATENT DOCUMENTS

| | | | |
|---|---|---|---|
| 9,146,656 B1* | 9/2015 | Srinivasan | G06Q 50/01 |
| 2005/0120306 A1* | 6/2005 | Klassen | G06F 3/0488 |
| | | | 715/765 |
| 2012/0066612 A1* | 3/2012 | Virmani | G06F 9/451 |
| | | | 715/748 |
| 2012/0112908 A1* | 5/2012 | Prykari | H04L 67/55 |
| | | | 340/540 |

(Continued)

FOREIGN PATENT DOCUMENTS

| | | |
|---|---|---|
| CN | 107688478 A | 2/2018 |
| CN | 109032732 A | 12/2018 |
| CN | 109923507 A | 6/2019 |

*Primary Examiner* — William L Bashore
*Assistant Examiner* — Gregory A Distefano
(74) *Attorney, Agent, or Firm* — Slater Matsil, LLP

(57) ABSTRACT

A notification processing method includes: displaying a first window and a second window in a display screen by regions; and popping up, in response to a preset operation on the first window, a first notification bar corresponding to the first window, and displaying, in the first notification bar, a current notification message of the first window or a notification message of a current application corresponding to the first window.

19 Claims, 11 Drawing Sheets

(56) References Cited

U.S. PATENT DOCUMENTS

| | | | |
|---|---|---|---|
| 2013/0159417 A1* | 6/2013 | Meckler | G06F 21/6218 |
| | | | 709/204 |
| 2014/0325430 A1* | 10/2014 | Vranjes | G06F 9/445 |
| | | | 715/788 |
| 2016/0191429 A1 | 6/2016 | Lee et al. | |
| 2016/0283090 A1* | 9/2016 | Seo | H04B 1/40 |
| 2019/0342252 A1* | 11/2019 | Dascola | G06F 3/0482 |
| 2019/0347181 A1* | 11/2019 | Cranfill | G06F 11/3013 |

* cited by examiner

NOTIFICATION PROCESSING METHOD AND APPARATUS, TERMINAL, AND STORAGE MEDIUM

CROSS-REFERENCE TO RELATED APPLICATIONS

This application is a National Stage of International Application No. PCT/CN2021/109990, filed on Aug. 2, 2021, which claims priority to Chinese Patent Application No. 202010768422.9, filed on Aug. 3, 2020 and Chinese Patent Application No. 202110868907.X, filed on Jul. 30, 2021. All of the aforementioned patent applications are hereby incorporated by reference in their entireties.

TECHNICAL FIELD

This application relates to the field of terminal device technologies, and in particular, to a notification processing method and apparatus, a terminal, and a storage medium.

BACKGROUND

With the development of intelligent terminals such as mobile phones, functions of a terminal become increasingly powerful, a quantity of applications installed by a user is also increasing, and different applications have corresponding notification messages. As a result, when using the terminal, the user may face a large quantity of notification messages. If the user does not clear the notification messages in time, it is difficult to find, from the large quantity of notification messages, a notification message that the user pays attention to.

SUMMARY

Technical solutions of this application provide a notification processing method and apparatus, a terminal, and a storage medium. In a multi-window scenario, a notification message of a corresponding application or a window is displayed based on the window, so that a user can more conveniently find a notification message that the user pays attention to.

According to a first aspect, a technical solution of this application provides a notification processing method, including: displaying a first window and a second window in a display screen by regions; and popping up, in response to a preset operation on the first window, a first notification bar corresponding to the first window, and displaying, in the first notification bar, a current notification message of the first window or a notification message of a current application corresponding to the first window. If the first notification bar displays the current notification message of the first window, a notification message other than the current notification message of the first window is not displayed in the first notification bar; or if the first notification bar displays the notification message of the current application corresponding to the first window, a notification message other than the notification message of the current application corresponding to the first window is not displayed in the first notification bar.

According to the notification processing method in this embodiment of this application, in a multi-window scenario, in response to a preset operation on a window, a notification bar corresponding to the window is popped up, and a notification message of the window or a notification message of a current application corresponding to the window is displayed in the notification bar. In this way, only the notification message that the user pays attention to is displayed, thereby avoiding interference caused by another notification message to the user, and enabling the user to more conveniently find the notification message that the user pays attention to.

Optionally, before the process of popping up, in response to a preset operation on the first window, a first notification bar corresponding to the first window, the method further includes: displaying a window notification mode selection interface, where the window notification mode selection interface includes a first mode option and a second mode option; and using a first mode as a current notification display mode in response to selection of the first mode option, or using a second mode as a current notification display mode in response to selection of the second mode option; and the process of popping up, in response to a preset operation on the first window, a first notification bar corresponding to the first window, and displaying, in the first notification bar, a current notification message of the first window or a notification message of a current application corresponding to the first window includes: in response to the preset operation on the first window, if the current notification display mode is the first mode, popping up the first notification bar corresponding to the first window, and displaying, in the first notification bar, the current notification message of the first window; or in response to the preset operation on the first window, if the current notification display mode is the second mode, popping up the first notification bar corresponding to the first window, and displaying, in the first notification bar, the notification message of the current application corresponding to the first window.

Optionally, the display screen displays a status bar outside the first window and the second window; and the notification processing method further includes: popping up a third notification bar in response to a preset operation on the status bar, and displaying notification messages of all applications in the third notification bar.

Optionally, each notification message in the first notification bar is completely displayed in the first notification bar, and at least one notification message in the third notification bar is incompletely displayed in the third notification bar.

Optionally, the displaying notification messages of all applications in the third notification bar includes: displaying, in the third notification bar, preview notification messages that belong to a same application, and in response to selection of the preview notification messages, unfolding the preview notification messages to a plurality of completely displayed notification messages.

Optionally, the process of popping up, in response to a preset operation on the first window, a first notification bar corresponding to the first window, and displaying, in the first notification bar, a current notification message of the first window or a notification message of a current application corresponding to the first window includes: in response to an instruction generated for the preset operation on the first window, obtaining current information about the first window or information about the current application corresponding to the first window; obtaining a window notification message set of a corresponding window based on the current information about the first window, or obtaining an application notification message set of a corresponding application based on the information about the current application corresponding to the first window; and generating the first notification bar based on the window notification message set or the application notification message set, and displaying, in the first notification bar, the current notification message of the first window or the notification message of the current application corresponding to the first window.

Optionally, the preset operation is a slide-down gesture operation.

According to a second aspect, a technical solution of this application provides a notification processing apparatus, including: a processor and a memory, where the memory is configured to store at least one instruction, and the instruction is loaded and executed by the processor to implement the foregoing notification processing method.

According to a third aspect, a technical solution of this application provides a terminal, including the foregoing notification processing apparatus.

According to a fourth aspect, a technical solution of this application provides a computer-readable storage medium, storing a computer program, where the computer program, when run on a computer, causes the computer to perform the foregoing notification processing method.

DETAILED DESCRIPTION OF ILLUSTRATIVE EMBODIMENTS

Terms used in embodiments of this application are only used for explaining specific embodiments of this application, but are not intended to limit this application.

Figure 1:
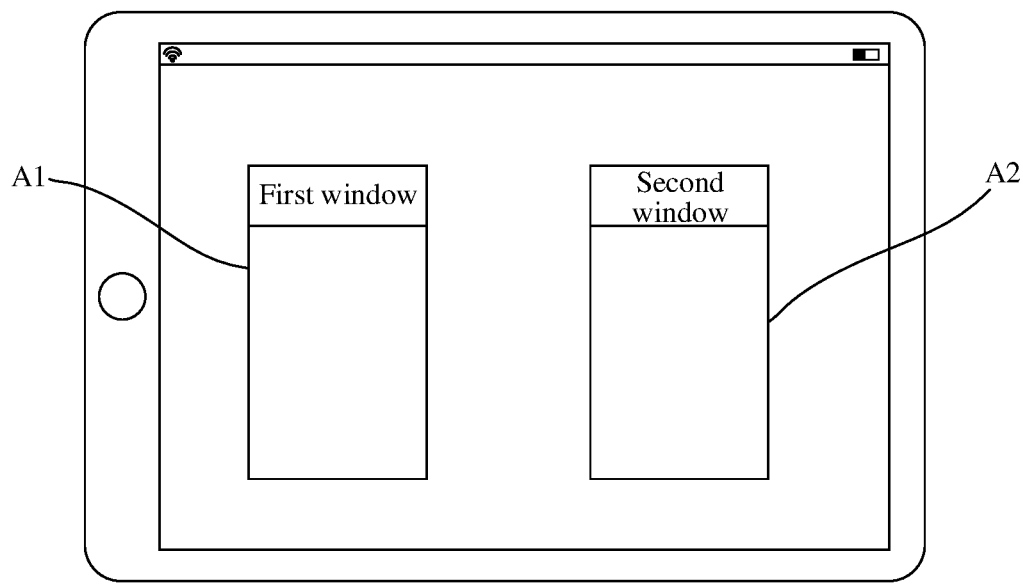
FIG. 1 is a schematic diagram of a multi-window scenario state.
Figure 2:
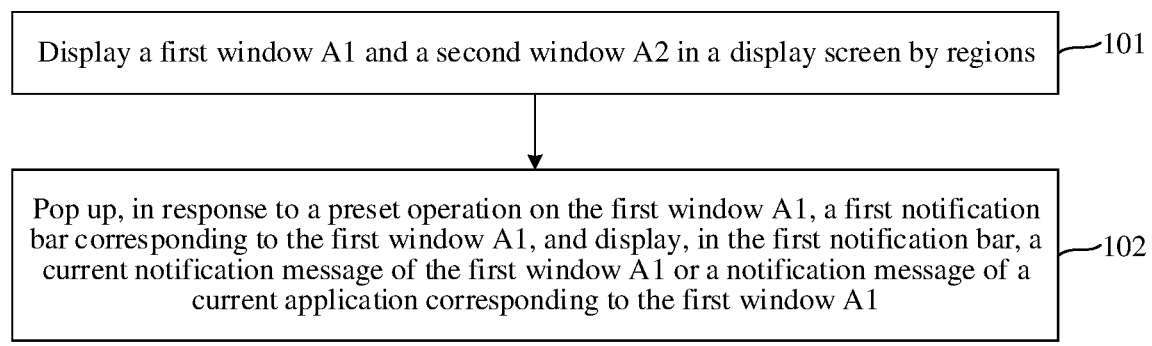
FIG. 2 is a schematic flowchart of a notification processing method according to an embodiment of this application.

Before the embodiments of this application are specifically described, a scenario involved in this application is first briefly described. A terminal involved in this application may be a mobile phone, a tablet computer, a personal computer (personal computer, PC), a personal digital assistant (personal digital assistant, PDA), a smart watch, a netbook, a wearable electronic device, an augmented reality (augmented reality, AR) device, a virtual reality (virtual reality, VR) device, a vehicle-mounted device, a smart car, a smart speaker, a robot, smart glasses, or the like. The terminal has a display screen. As a requirement of a user for using a large screen increases, a scenario in which multiple windows are used becomes more frequent. As shown in FIG. 1, FIG. 1 is a schematic diagram of a multi-window scenario state. A multi-window scenario means that a user opens two windows simultaneously on a foreground, the two windows are simultaneously displayed in different regions of the display screen, and each window corresponds to one application. For example, a first window A1 and a second window A2 are displayed in the display screen, and the user may open a social chat application in the first window A1, and open a browser application in the second window A2 to browse a web page simultaneously. In this multi-window scenario, in the prior art, if notifications are not cleared for a period of time, when the user pulls down a notification bar, the user may see a large quantity of notification messages, and it is difficult for the user to find a desired notification. For the foregoing problem, the inventor proposes technical solutions in the embodiments of this application, and the following describes the technical solutions in the embodiments of this application.

Figure 3:
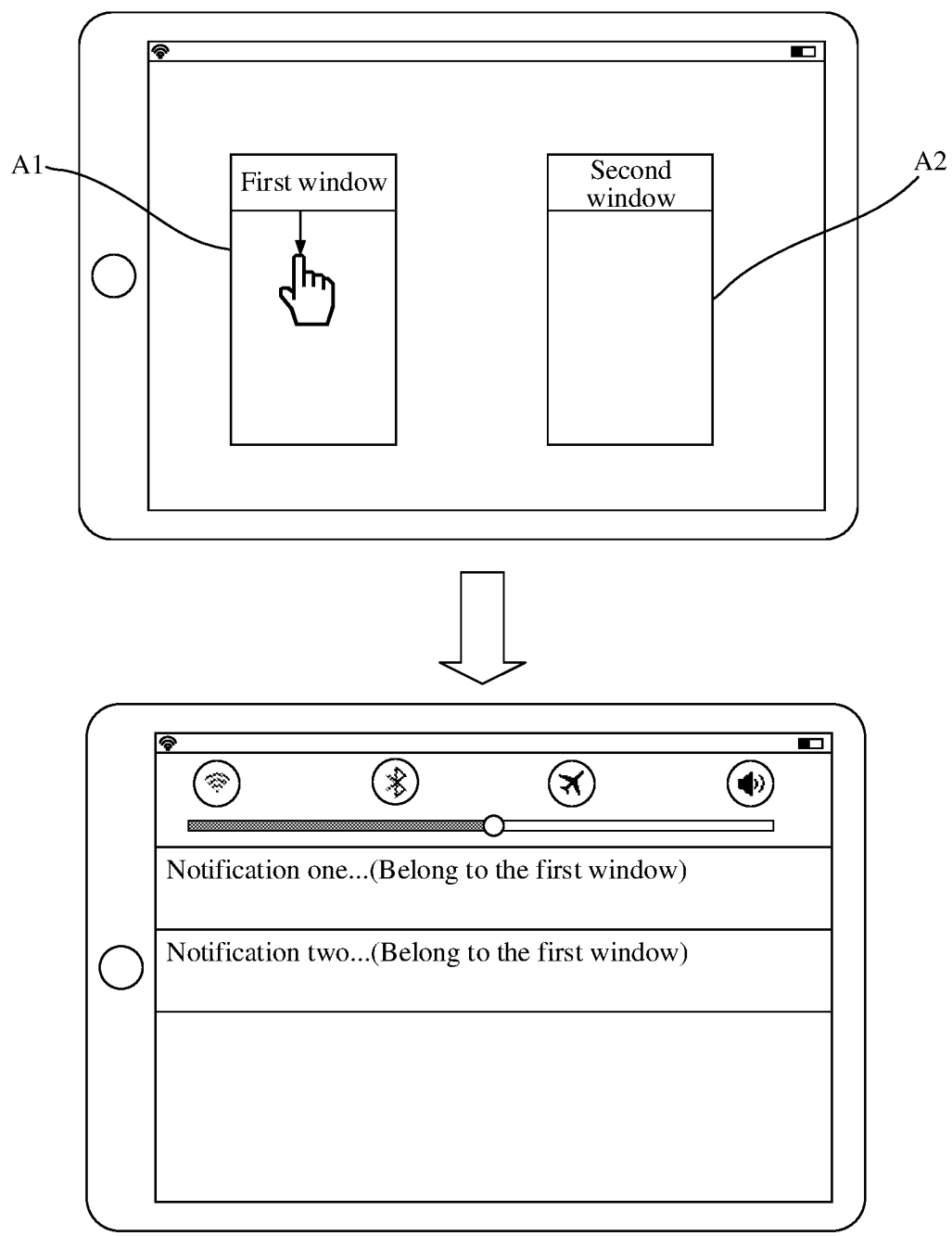
FIG. 3 is a schematic diagram of an interface change of popping up a first notification bar according to an embodiment of this application.
Figure 4A:
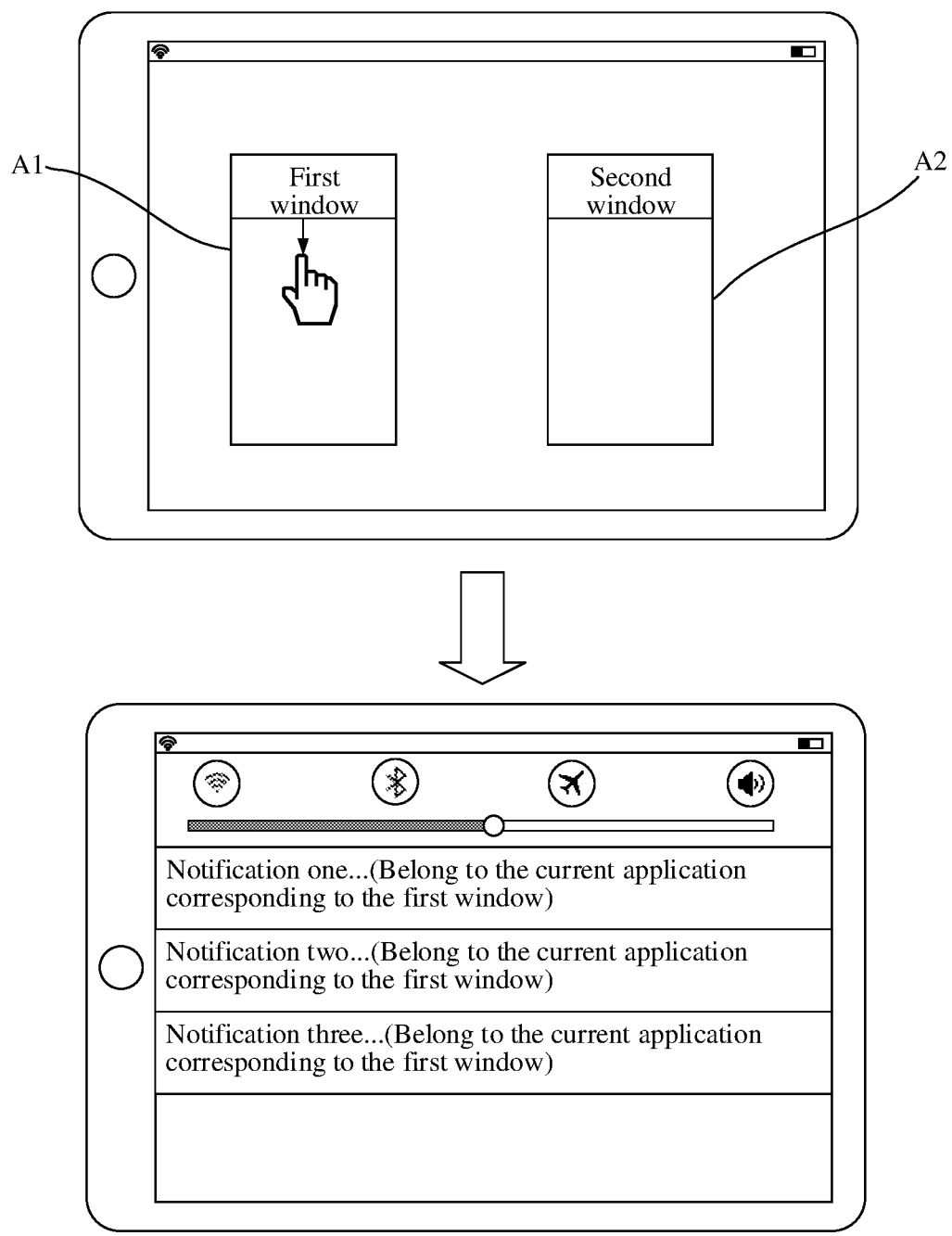
FIG. 4A is another schematic diagram of an interface change of popping up a first notification bar according to an embodiment of this application.

As shown in FIG. 1, FIG. 2, FIG. 3, and FIG. 4A FIG. 2 is a schematic flowchart of a notification processing method according to an embodiment of this application; FIG. 3 is a schematic diagram of an interface change of popping up a first notification bar according to an embodiment of this application; and FIG. 4A is another schematic diagram of an interface change of popping up a first notification bar according to an embodiment of this application. An embodiment of this application provides a notification processing method, and the method includes the following steps.

Step 101. Display a first window A1 and a second window A2 in a display screen by regions, that is, enter a multi-window scenario shown in FIG. 1. It should be noted that, in this embodiment of this application, a scenario in which only two windows are displayed in the display screen is used as an example for description, but a quantity of windows in the multi-window scenario is not limited. In another feasible implementation, a larger quantity of windows may be displayed in the display screen, and for example, three windows are displayed.

Step 102. Pop up, in response to a preset operation on the first window A1, a first notification bar corresponding to the first window A1, and display, in the first notification bar, a current notification message of the first window A1 or a notification message of a current application corresponding to the first window A1. If the first notification bar displays the current notification message of the first window A1, a notification message other than the current notification message of the first window A1 is not displayed in the first notification bar; and if the first notification bar displays the notification message of the current application corresponding to the first window A1, a notification message other than the notification message of the current application corresponding to the first window A1 is not displayed in the first notification bar.

Specifically, for example, the user performs a pull-down gesture operation on a title bar of the first window A1, and after recognizing the operation, the terminal generates and pops up the first notification bar. For example, a current application corresponding to the first window A1 is a social application B, where there are multiple chat windows, and the first window A1 corresponds to a chat window C. In the first notification bar shown in FIG. 3, only a current notification message of the first window A1 is displayed, and a notification message other than the notification message of the window is not displayed. In this way, when the user pays attention to the first window A1 and performs a pull-down gesture operation on the first window A1, the user directly browses the current notification message of the first window A1, thereby avoiding interference of notification messages in a large quantity of other windows or applications to the user. For example, only a notification one and a notification two that belong to the chat window C are displayed in the first notification bar, a notification message that belongs to another chat window is not displayed in the first notification bar, and a notification message that belongs to another application is also not displayed in the first notification bar. Similarly, in the first notification bar shown in FIG. 4A, only a notification message of a current application corresponding to the first window A1 is displayed, and a notification message other than the notification message of the application is not displayed. In this way, when the user pays attention to the first window A1 and performs a pull-down gesture operation on the first window A1, the user directly browses the notification message of the current application corresponding to the first window A1, thereby avoiding interference of notification messages in a large quantity of other applications to the user. For example, only a notification one, a notification two, and a notification three that belong to the social application B are displayed in the first notification bar, where the notification one and the notification two belong to the chat window C, and the notification three belongs to a chat window D. However, the notification one, the notification two, and the notification three all belong to the social application B, and a notification message that belongs to another application is not displayed in the first notification bar. Whether the first notification bar specifically displays the notification message of the first window A1 or the notification message of the application corresponding to the first window A1 may be preset or automatically switched based on a policy. In addition, it should be noted that, when the display screen displays the first notification bar, a level of a notification bar is higher than that of a window, the first window A1 is hidden under the notification bar, and if the user controls to hide the first notification bar, the first window A1 is displayed again.

Figure 4B:
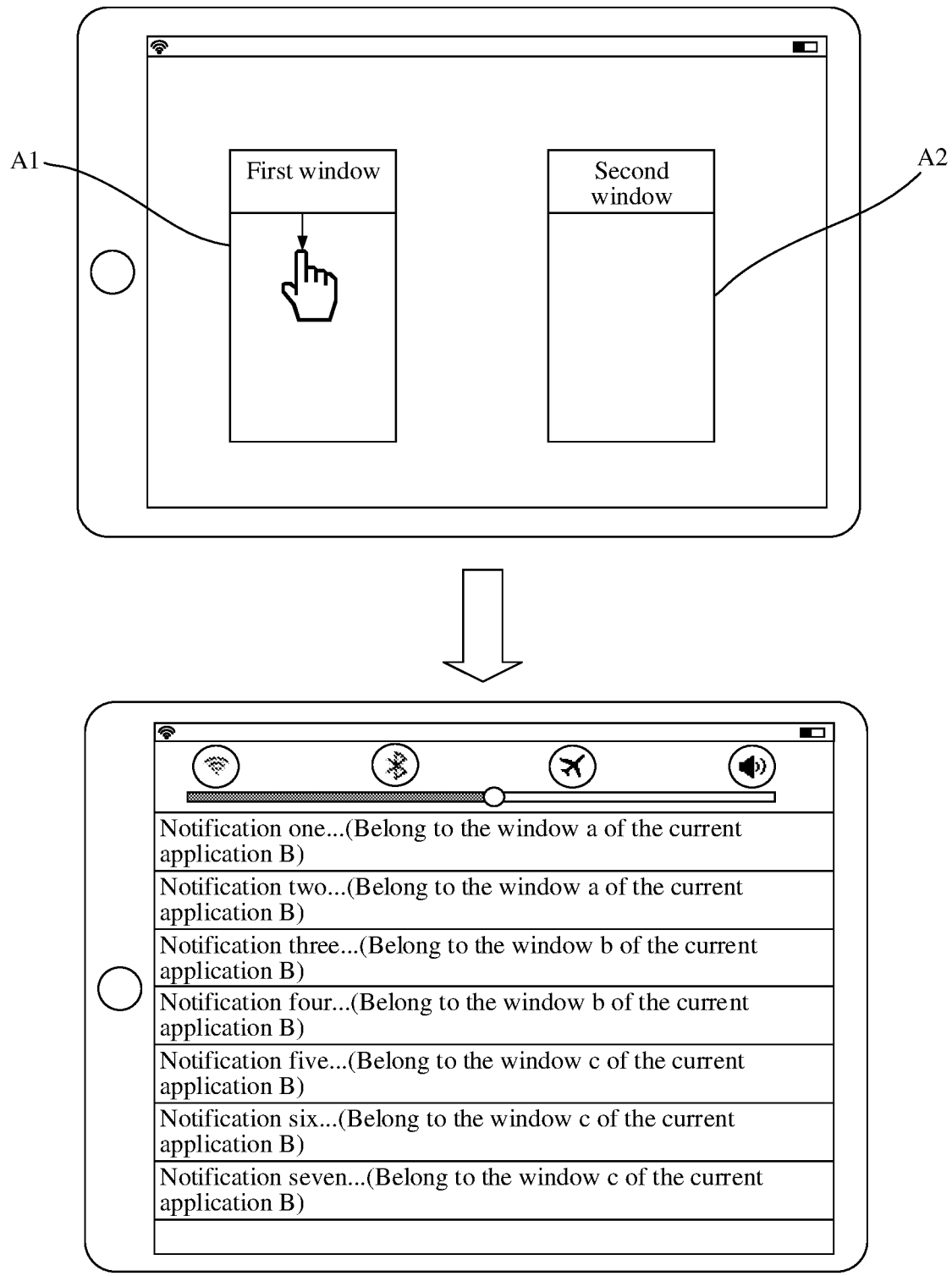
FIG. 4B is another schematic diagram of an interface change of popping up a first notification bar according to an embodiment of this application.

In addition, for a scenario in which the first notification bar displays the notification message of the current application corresponding to the first window A1, it may be further understood with reference to FIG. 4B. In the first notification bar shown in FIG. 4B, only the notification message of the current application corresponding to the first window A1 is displayed, and a notification message other than the notification message of the application is not displayed. In this way, when the user pays attention to the first window A1 and performs a pull-down gesture operation on the first window A1, the user directly browses the notification message of the current application corresponding to the first window A1, thereby avoiding interference of notification messages in a large quantity of other applications to the user. For example, the first window A1 corresponds to the current application B. In response to a preset operation on the first window A1, the first notification bar corresponding to the first window A1 pops up, and a notification message of the current application B corresponding to the first window A1 is displayed in the first notification bar, where a notification one, a notification two, a notification three, a notification four, a notification five, a notification six, and a notification seven are included. The notification one and the notification two belong to a window a of the current application B corresponding to the first window A1, the notification three and the notification four belong to a window b of the current application B corresponding to the first window A1, and the notification five, the notification six, and the notification seven belong to a window c of the current application B corresponding to the first window A1. For example, the window a may be the first window A1, the current application B is the social application B, the first window A1 and the window a are a group chat window a of the social application B, the window b is a single chat window b of the social application B with A, and the window c is a single chat window c of the social application B with B. In step 101, the windows displayed by regions in the display screen include the group chat window a of the social application B. In response to the preset operation on the group chat window a, the first notification bar pops up, the first notification bar displays only the notification one to the notification seven that belong to the social application B, and a notification message that belongs to another application is not displayed in the first notification bar.

Figure 5:
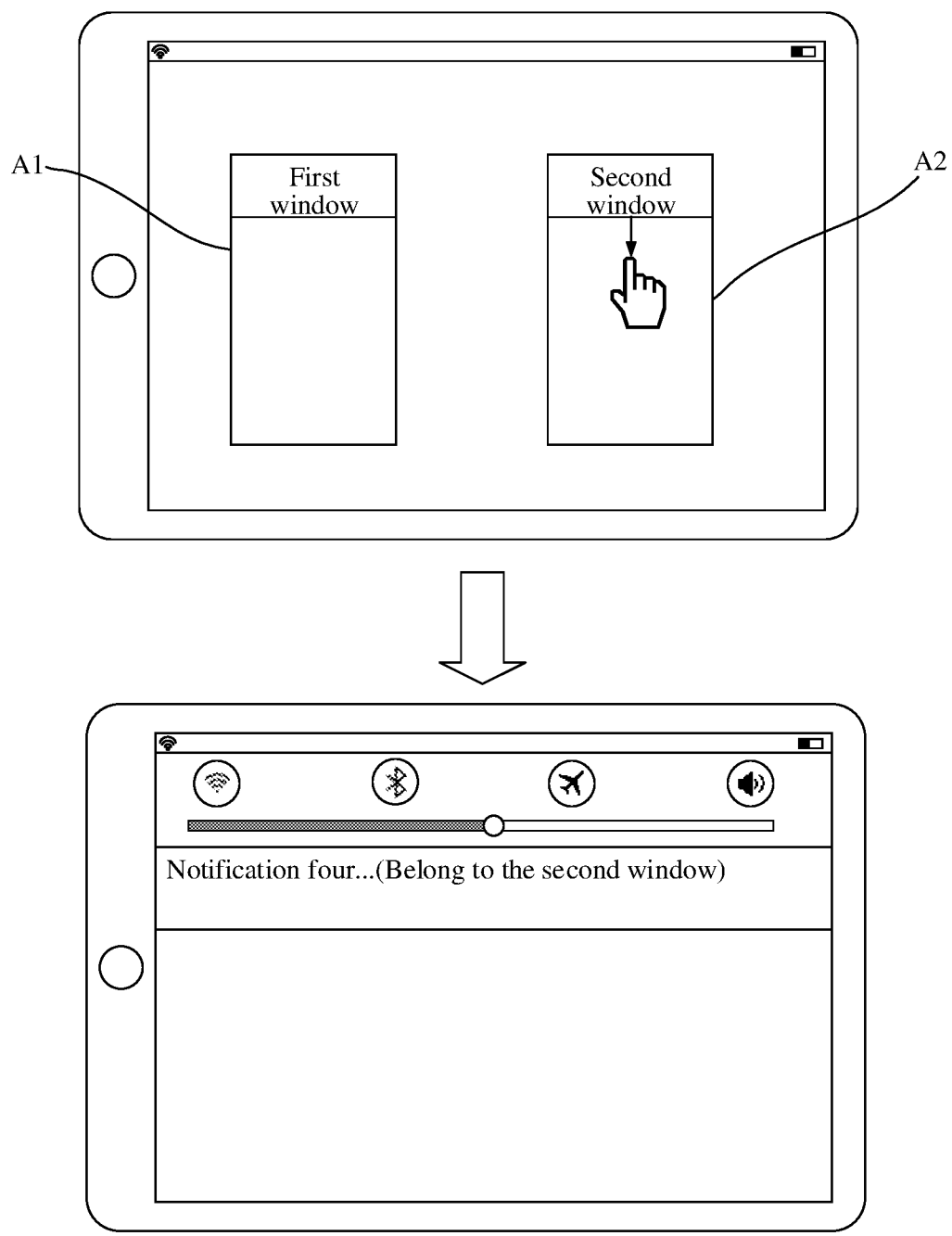
FIG. 5 is a schematic diagram of an interface change of popping up a second notification bar according to an embodiment of this application.
Figure 6:
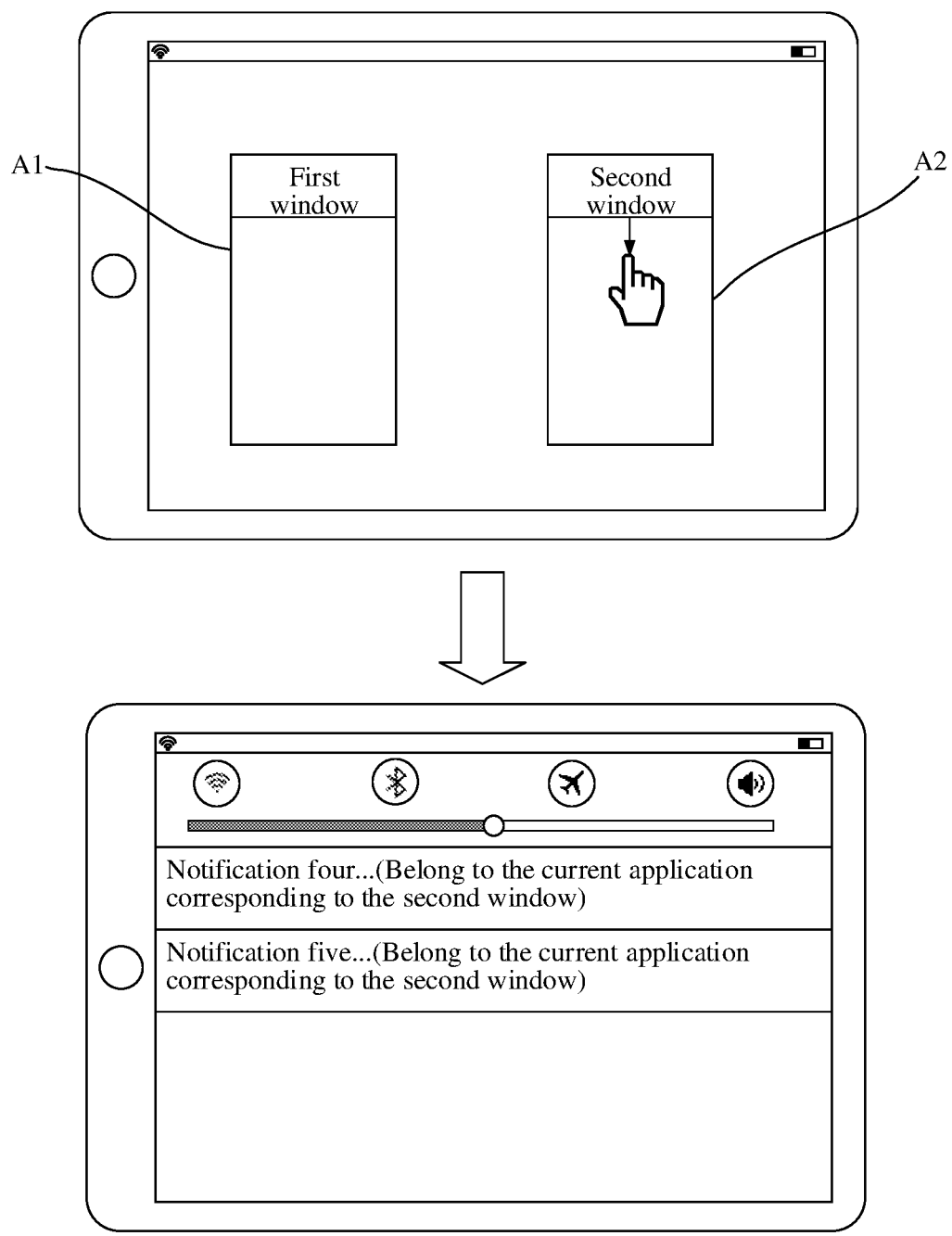
FIG. 6 is another schematic diagram of an interface change of popping up a second notification bar according to an embodiment of this application.

In a possible implementation, as shown in FIG. 5 and FIG. 6, FIG. 5 is a schematic diagram of an interface change of popping up a second notification bar according to an embodiment of this application, and FIG. 6 is another schematic diagram of an interface change of popping up a second notification bar according to an embodiment of this application. The notification processing method further includes: in response to a preset operation on the second window, popping up a second notification bar corresponding to the second window, and displaying, in the second notification bar, a current notification message of the second window A2 or a notification message of a current application corresponding to the second window. If the second notification bar displays the current notification message of the second window A2, a notification message other than the current notification message of the second window A2 is not displayed in the second notification bar; and if the second notification bar displays the notification message of the current application corresponding to the second window A2, a notification message other than the notification message of the current application corresponding to the second window A2 is not displayed in the second notification bar. For example, the user performs a pull-down gesture operation on a title bar of the second window A2, and after recognizing the operation, the terminal generates and pops up the second notification bar. For example, a current application corresponding to the second window A2 is a browser application E, where there are multiple web page windows, and the second window A2 corresponds to a web page window F. In the second notification bar shown in FIG. 5, only a current notification message of the second window A2 is displayed, and a notification message other than the notification message of the window is not displayed. For example, only a notification four that belongs to the web page window F is displayed in the second notification bar, a notification message that belongs to another web page window is not displayed in the second notification bar, and a notification message that belongs to another application is also not displayed in the second notification bar. Similarly, in the second notification bar shown in FIG. 6, only a notification message of a current application corresponding to the second window A2 is displayed, and a notification message other than the notification message of the application is not displayed. For example, only a notification four and a notification five that belong to the browser application E are displayed in the second notification bar, where the notification four belongs to the web page window F, and the notification five belongs to a web page window G. However, the notification four and the notification five both belong to the browser application E, and a notification message that belongs to another application is not displayed in the second notification bar.

According to the notification processing method in this embodiment of this application, in a multi-window scenario, in response to a preset operation on a window, a notification bar corresponding to the window is popped up, and a current notification message of the window or a notification message of a current application corresponding to the window is displayed in the notification bar. In this way, only the notification message that the user pays attention to is displayed, thereby avoiding interference caused by another notification message to the user, and enabling the user to more conveniently find the notification message that the user pays attention to.

Figure 7:
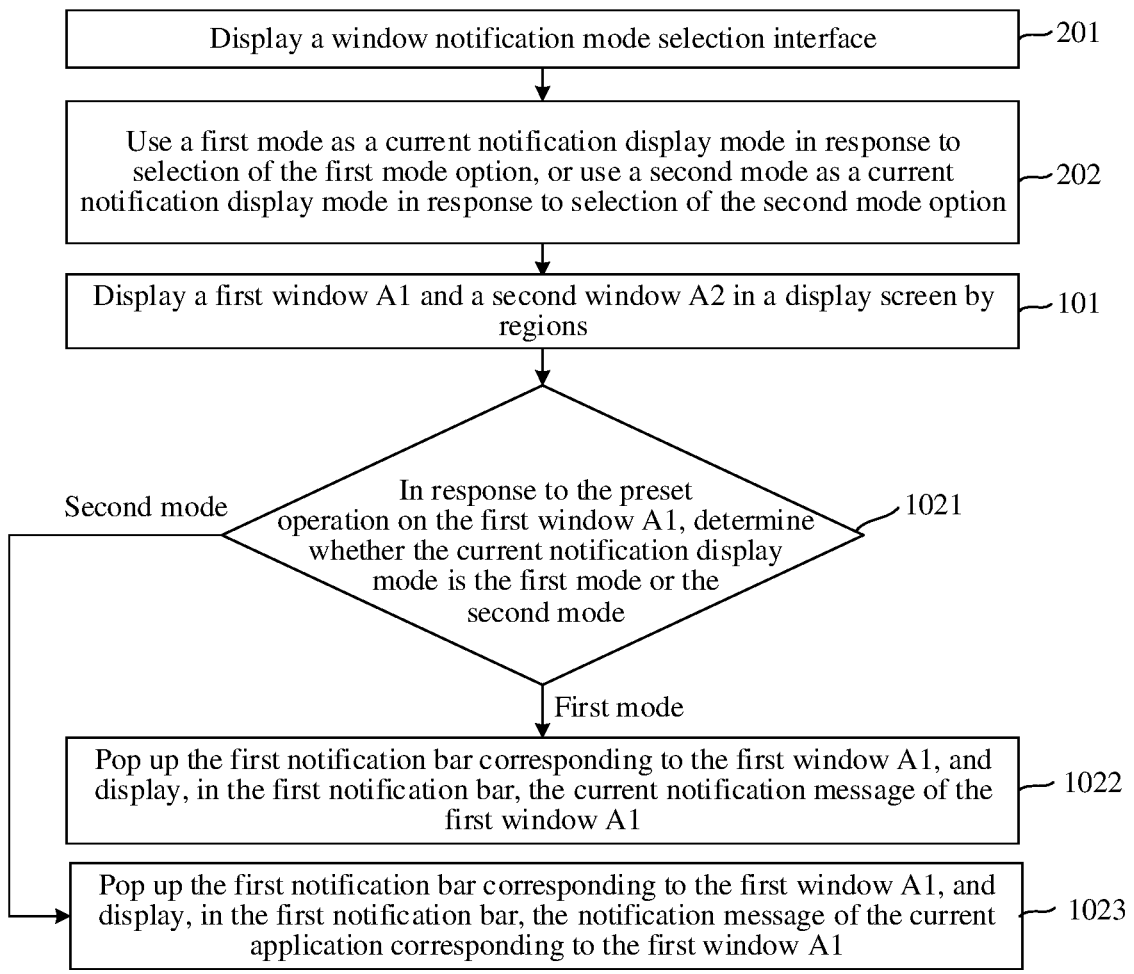
FIG. 7 is a schematic flowchart of another notification processing method according to an embodiment of this application.
Figure 8:
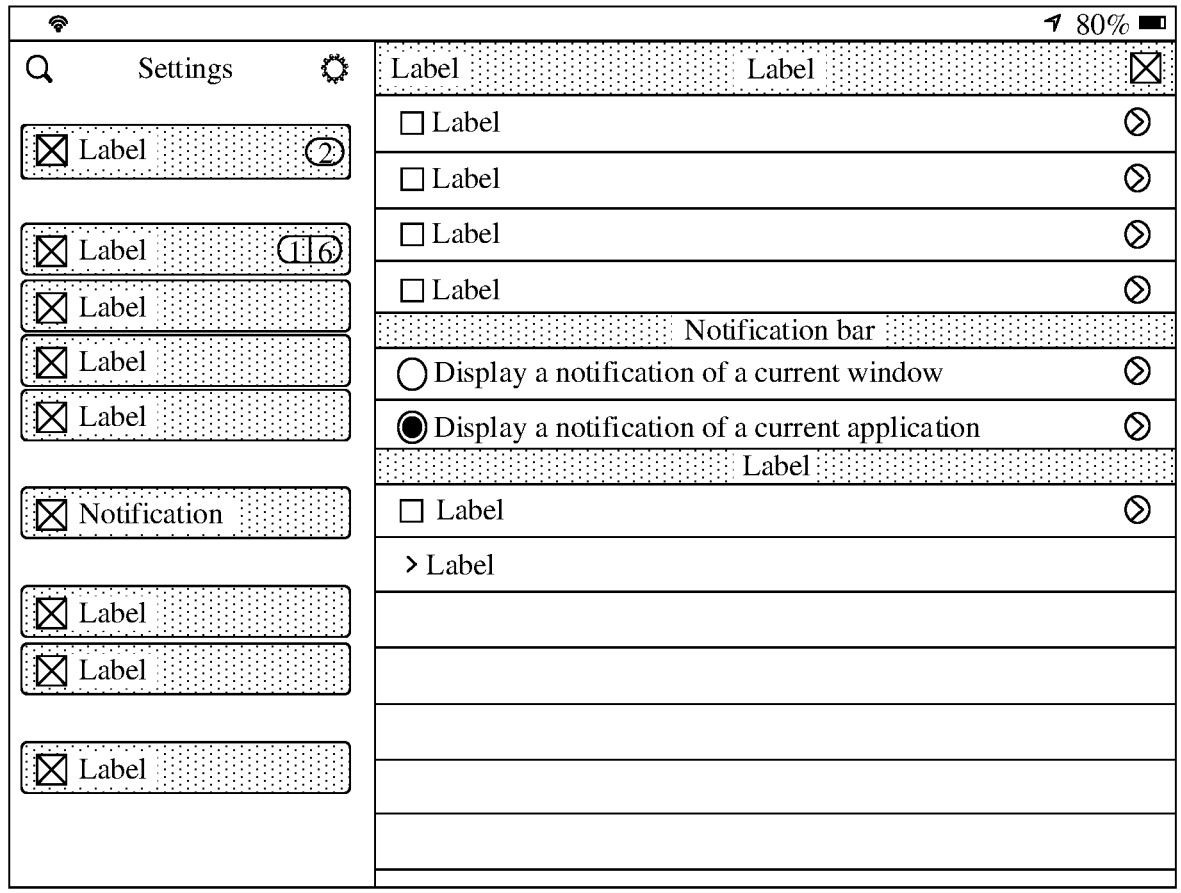
FIG. 8 is a schematic diagram of a window notification mode selection interface according to an embodiment of this application.

In a possible implementation, as shown in FIG. 7 and FIG. 8, FIG. 7 is a schematic flowchart of another notification processing method according to an embodiment of this application, and FIG. 8 is a schematic diagram of a window notification mode selection interface according to an embodiment of this application. Before the process of step 102 of popping up, in response to a preset operation on the first window A1, a first notification bar corresponding to the first window A1, the method further includes:

Step 201: Display a window notification mode selection interface, where the window notification mode selection interface includes a first mode option and a second mode option. For example, in the window notification mode selection interface in FIG. 8, a text descriptions corresponding to the first mode option is "display a notification of a current window", and a text description corresponding to the second mode option is "display a notification of a current application".

Step 202. Use a first mode as a current notification display mode in response to selection of the first mode option, or use a second mode as a current notification display mode in response to selection of the second mode option.

The process of step 102 of popping up, in response to a preset operation on the first window A1, a first notification bar corresponding to the first window A1, and displaying, in the first notification bar, a current notification message of the first window or a notification message of a current application corresponding to the first window includes:

Step 1021. In response to the preset operation on the first window A1, determine whether the current notification display mode is the first mode or the second mode, if the current notification display mode is the first mode, perform step 1022, and if the current notification display mode is the second mode, perform step 1023.

Step 1022. Pop up the first notification bar corresponding to the first window A1, and display, in the first notification bar, the current notification message of the first window A1. A specific process is the same as the process shown in FIG. 3. That is, if the user selects the first mode in the window notification mode selection interface, all subsequently popped-up first notification bars correspondingly display the current notification message of the first window A1.

Step 1023. Pop up the first notification bar corresponding to the first window A1, and display, in the first notification bar, the notification message of the current application corresponding to the first window A1. A specific process is the same as the process shown in FIG. 4A. That is, if the user selects the second mode in the window notification mode selection interface, all subsequently popped-up first notification bars correspondingly display the notification message of the current application corresponding to the first window A1.

Specifically, in the method shown in FIG. 7, the process of step 201 of displaying a window notification mode selection interface may be performed in a multi-window scenario or before entering a multi-window scenario. The user may enter the interface at any time to select and switch a window notification mode. In addition, when the second notification bar pops up, display logic of the second notification bar may also be displayed based on a current window notification mode. That is, if the current window notification mode is the first mode, the second notification bar displays the current notification message of the second window A2, and if the current window notification mode is the second mode, the second notification bar displays the notification message of the current application corresponding to the second window A2. Display logic of a notification bar corresponding to a window may be switched based on selection of the user, so as to implement flexible configuration of display of the notification bar and meet a requirement of the user.

Figure 9:
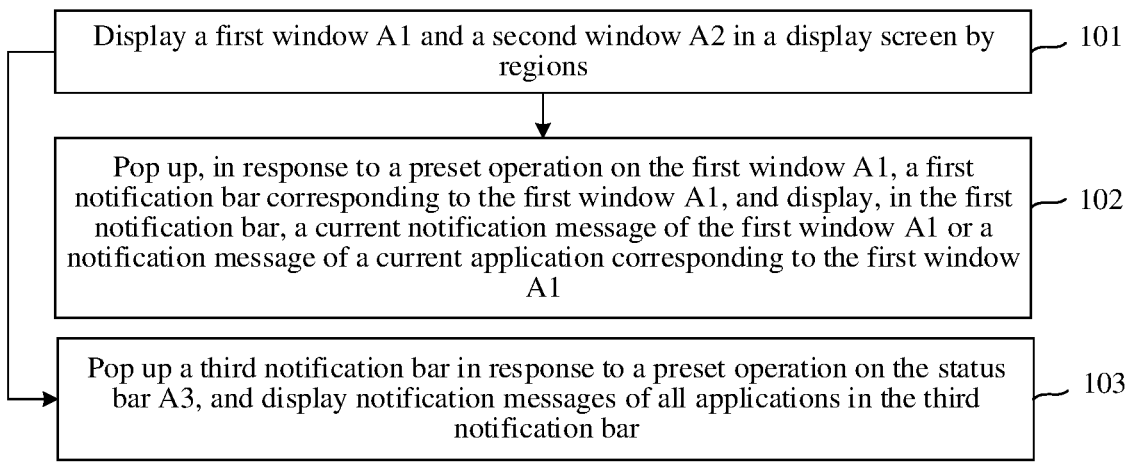
FIG. 9 is a schematic flowchart of another notification processing method according to an embodiment of this application.
Figure 10:
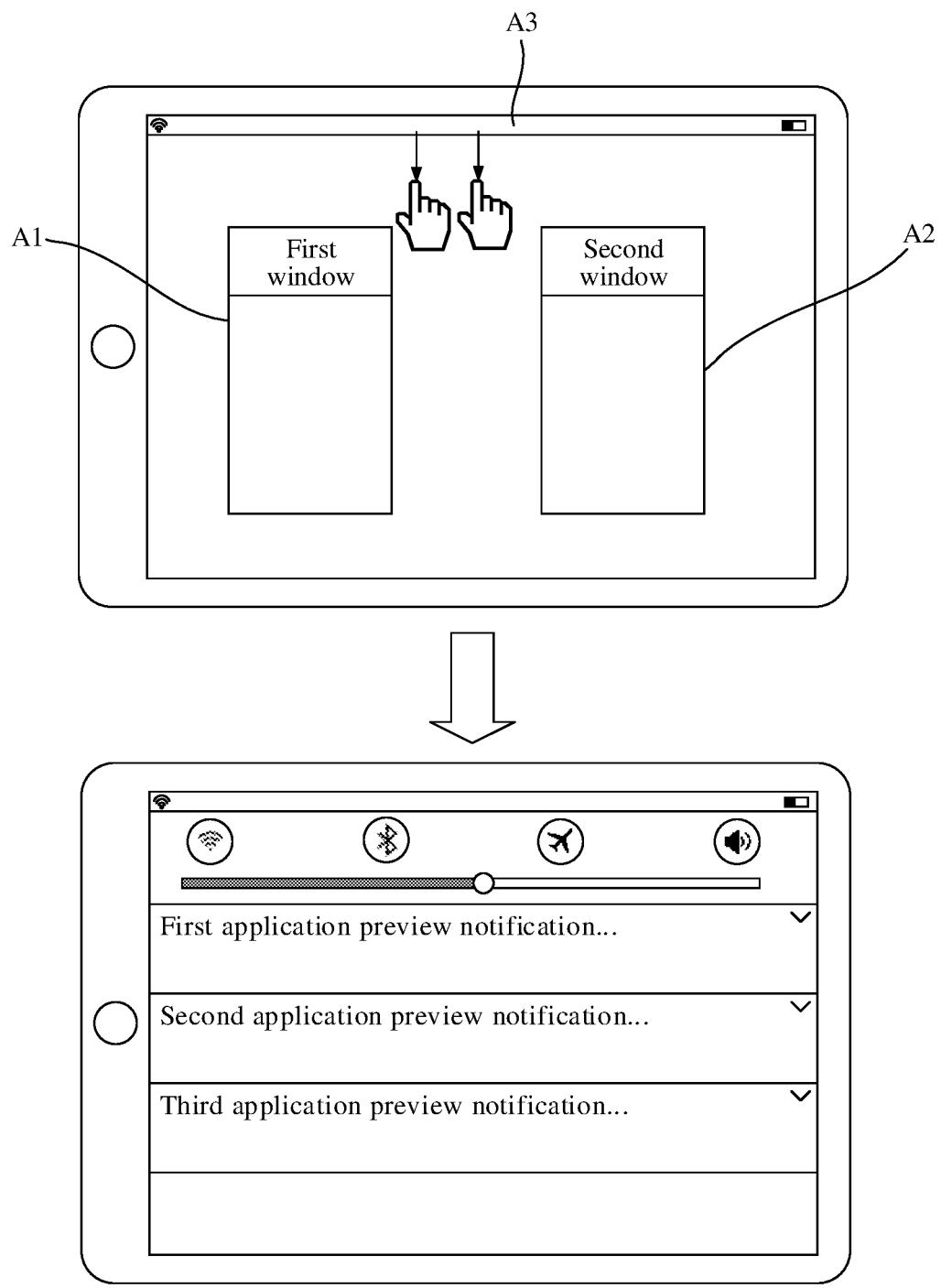
FIG. 10 is a schematic diagram of an interface change of popping up a third notification bar according to an embodiment of this application.

In a possible implementation, as shown in FIG. 9 and FIG. 10, FIG. 9 is a schematic flowchart of another notification processing method according to an embodiment of this application, and FIG. 10 is a schematic diagram of an interface change of popping up a third notification bar according to an embodiment of this application. The display screen displays a status bar A3 outside the first window A1 and the second window A2, and the status bar A3 may be located at an edge of the display screen. The method further includes:

Step 103. Pop up a third notification bar in response to a preset operation on the status bar A3, and display notification messages of all applications in the third notification bar.

Specifically, when the user intends to view a notification message that the user pays attention to, the user may pop up, by performing a preset operation on a window, a notification bar corresponding to the window, to display a notification message of a current window of the window or a notification message of a current application corresponding to the window. When the user intends to view all notification messages, the user may perform a preset operation on the status bar A3, for example, perform a pull-down gesture operation on the status bar A3. In this case, in response to the operation, a third notification bar pops up, and notification messages of all applications are displayed in the notification bar, so that the user can find other notifications outside the current window.

In a feasible implementation, as shown in FIG. 3, each notification message in the first notification bar is completely displayed in the first notification bar, and as shown in FIG. 10, at least one notification message in the third notification bar is incompletely displayed in the third notification bar. The first notification bar is used for displaying only a notification message corresponding to one window or one application, and a quantity of notification messages is relatively small. Therefore, to facilitate the user to read notifications more intuitively, each notification message may be completely displayed in the first notification bar. The third notification bar is used for displaying notification messages of all applications. As a result, a quantity of notification messages that need to be displayed may be relatively large. Therefore, the notification messages in the notification bar may be incompletely displayed in a manner of folding the notification messages, so that the user can read a larger quantity of notification messages within a limited range of the notification bar.

In a feasible implementation, the process of step 103 of displaying notification messages of all applications in the third notification bar includes: displaying, in the third notification bar, preview notification messages that belong to a same application, and in response to selection of the preview notification messages, unfolding the preview notification messages to a plurality of completely displayed notification messages.

Specifically, as shown in FIG. 10, for example, the notification messages displayed in the third notification bar include a first application preview notification message, a second application preview notification message, and a third application preview notification message, and each notification message is used for previewing only notification messages that belong to a same application. In this way, the user can browse notification messages of all applications. When the user, for example, taps and selects the first application preview notification message, the first application preview notification message is unfolded to display all specific notification messages of a first application.

Figure 11:
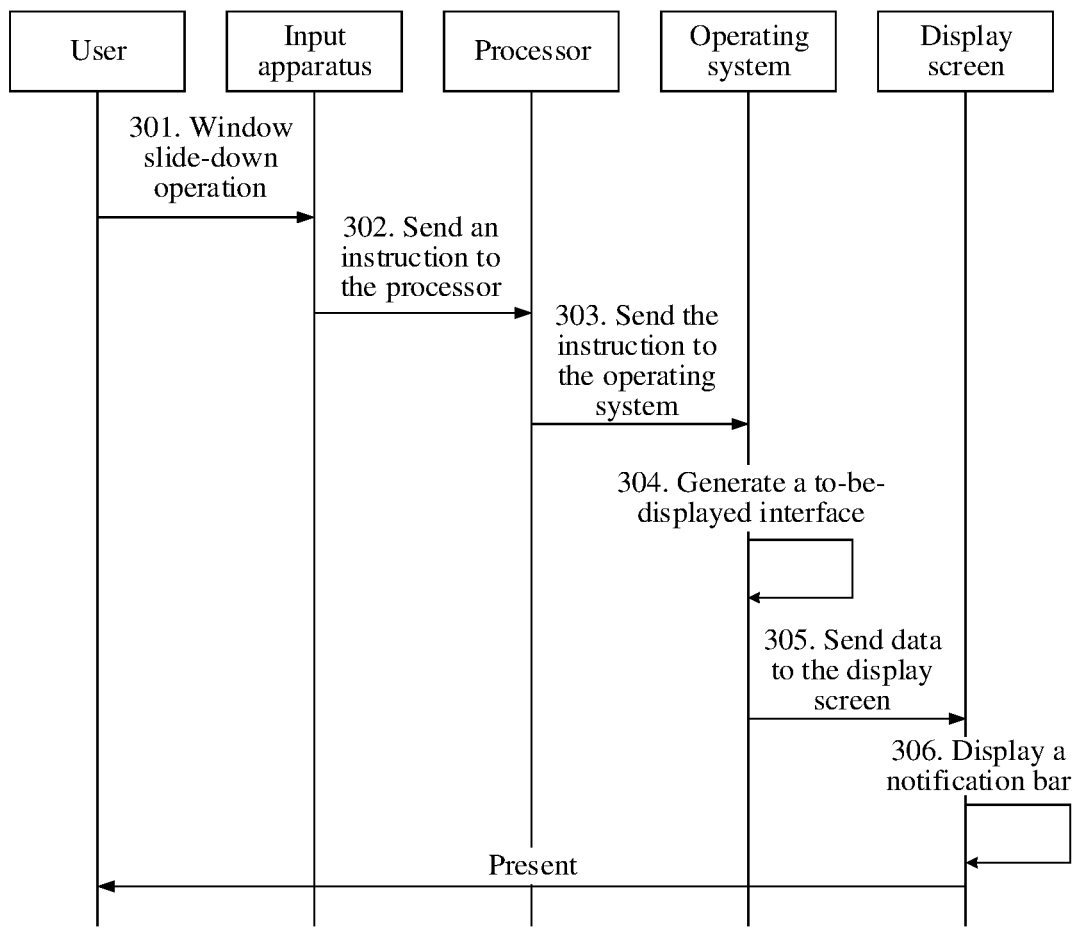
FIG. 11 is a flowchart of an overall architecture corresponding to a notification processing method according to an embodiment of this application.

In a feasible implementation, as shown in FIG. 11, FIG. 11 is a flowchart of an overall architecture corresponding to a notification processing method according to an embodiment of this application. An overall procedure of the notification processing method in this embodiment of this application includes the following steps.

Step 301. A user performs a window slide-down operation on an input apparatus of a terminal.

Specifically, for example, the input apparatus is a touchscreen of the terminal, and the user performs a window slide-down operation on a first window A1 on the touchscreen.

Step 302. The input apparatus sends an instruction to a processor.

Specifically, when the user performs the window slide-down operation on the first window A1, the input apparatus generates a corresponding instruction and sends the instruction to the processor of the terminal.

Step 303. The processor sends the instruction to an operating system.

Specifically, the processor converts the instruction generated by the input apparatus into an identifiable instruction, and sends the identifiable instruction to the operating system.

Step 304. The operating system generates a to-be-displayed interface.

Figure 12:
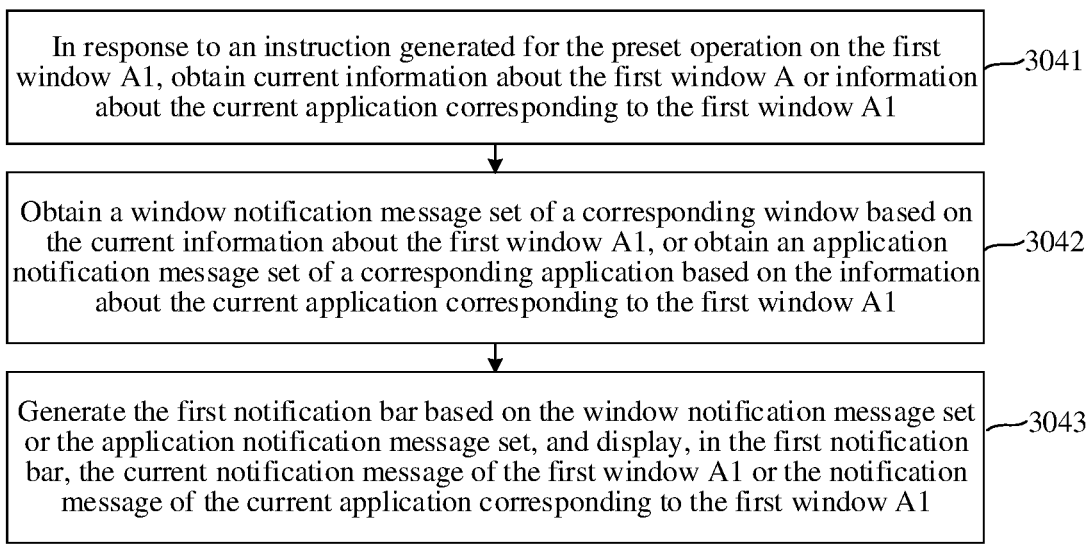
FIG. 12 is a partial schematic flowchart of a notification processing method according to an embodiment of this application.
Figure 13:
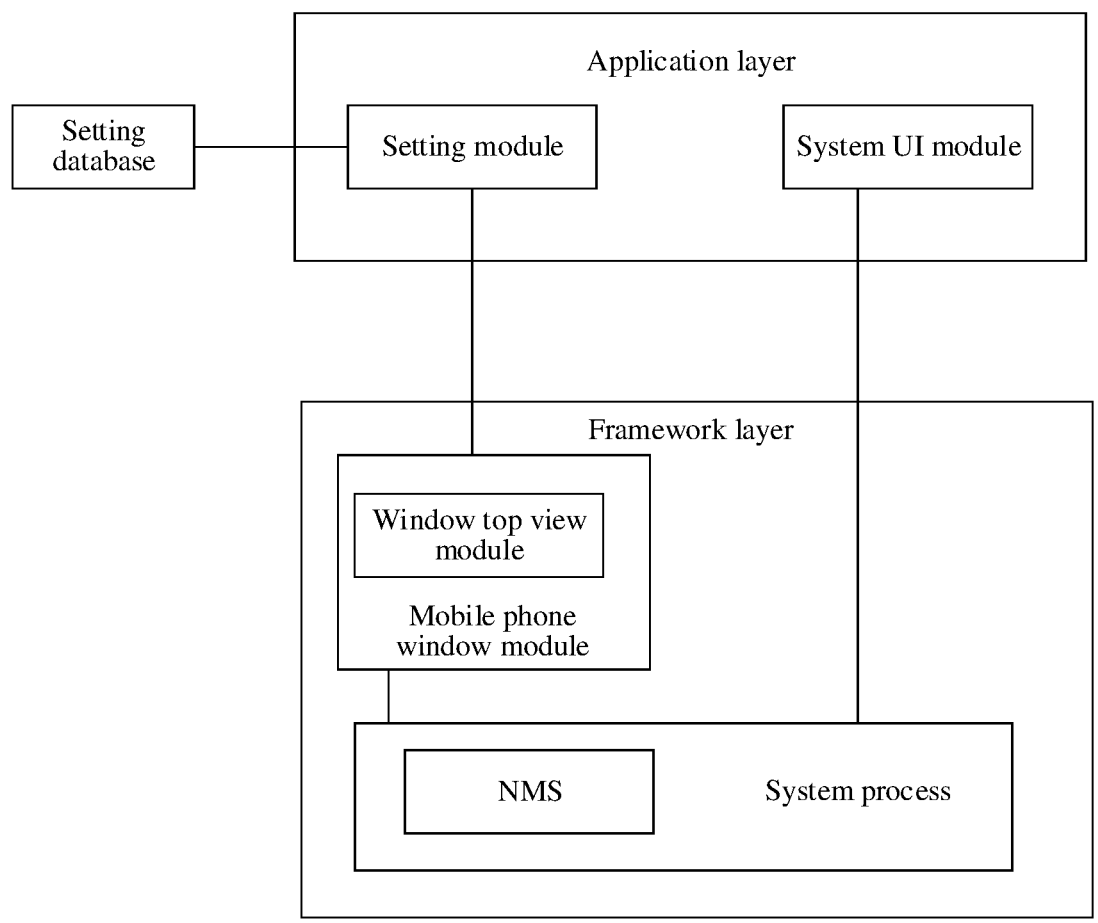
FIG. 13 is an architectural diagram of a system according to an embodiment of this application.

Specifically, the operating system generates the to-be-displayed interface according to the instruction, where the to-be-displayed interface includes a notification bar that needs to be displayed, and a specific process includes step 102. As shown in FIG. 12 and FIG. 13, FIG. 12 is a partial schematic flowchart of a notification processing method according to an embodiment of this application; and FIG. 13 is an architectural diagram of a system according to an embodiment of this application. The process of step 102 of popping up, in response to a preset operation on the first window A1, a first notification bar corresponding to the first window A1, and displaying, in the first notification bar, a current notification message of the first window A1 or a notification message of a current application corresponding to the first window A1 may include the following steps.

Step 3041. In response to an instruction generated for the preset operation on the first window A1, obtain current information about the first window A or information about the current application corresponding to the first window A1.

Step 3042. Obtain a window notification message set of a corresponding window based on the current information about the first window A1, or obtain an application notification message set of a corresponding application based on the information about the current application corresponding to the first window A1.

Step 3043. Generate the first notification bar based on the window notification message set or the application notification message set, and display, in the first notification bar, the current notification message of the first window A1 or the notification message of the current application corresponding to the first window A1.

Specifically, for example, in an Android system, a window slide-down event is monitored, that is, whether an instruction generated for the preset operation on the first window A1 is received is monitored. If the instruction is received, that is, the window slide-down event is monitored, information corresponding to the window is obtained. It should be noted that, whether a current window notification mode is a first mode or a second mode needs to be further obtained from a setting database by using a setting module, and the current window notification mode determines whether the notification bar displays a notification message of a current window or a notification message of a current application. After the event is monitored, a window top view module DecorView in a mobile phone window module PhoneWindow transmits information about a current page of the corresponding window and information about a current application process to a system process SystemServer. A notification manager service (Notification Manager Service, NMS) in the SystemServer obtains all current notification message sets of the window and all notification message sets of the current application corresponding to the window based on the current window notification mode. A system user interface (User Interface, UI) module obtains, from the setting database by using the setting module, whether the current window notification mode is the first mode or the second mode; if the current window notification mode is the first mode, invokes all the notification message sets of the current window in the NMS and generates a first notification bar based on the notification message sets; and if the current window notification module is the second mode, invokes all the notification message sets of the current application in the NMS and generates a first notification bar based on the sets, that is, generates a to-be-displayed interface, where the interface includes the generated first notification bar. The setting module and the system UI module belong to an application layer, and the PhoneWindow and the SystemServer belong to a framework layer Framework.

As shown in FIG. 11, after step 304, the method further includes: Step 305. The operating system sends data to a display screen, that is, sends display data corresponding to the generated to-be-displayed interface that includes a first notification bar to the display screen.

Step 306: The display screen displays a notification bar, to present the notification bar to the user.

In a feasible implementation, the foregoing preset operation is a slide-down gesture operation. In another feasible implementation, the preset operation may alternatively be another operation, provided that an operated object can be identified and distinguished, that is, whether an object of the preset operation is a window or a status bar can be determined, and which window is specifically the object of the preset operation can be determined.

An embodiment of this application further provides a notification processing apparatus, including a processor and a memory. The memory is configured to store at least one instruction, and when the instruction is loaded and executed by the processor, the notification processing method in the foregoing embodiments is implemented.

There may be one or more processors, and the processor and the memory may be connected by using a bus or in another manner. As a non-transient computer-readable storage medium, the memory may be configured to store a non-transient software program, a non-transient computer-executable program, and a module. The processor executes various functional applications and data processing by running the non-transient software program, instructions, and modules stored in the memory, that is, implements the method in any one of the foregoing method embodiments. The memory may include a program storage region and a data storage region. The program storage region may store an operating system, an application program required by at least one function, necessary data, and the like. In addition, the memory may include a high-speed random access memory and may further include a non-transient memory such as at least one magnetic disk storage device, a flash memory device, or another non-transient solid-state storage device.

An embodiment of this application further provides a terminal, including the notification processing apparatus in the foregoing embodiment. The terminal specifically may be a mobile phone, a tablet computer, a personal computer (personal computer, PC), a personal digital assistant (personal digital assistant, PDA), a smart watch, a netbook, a wearable electronic device, an augmented reality (augmented reality, AR) device, a virtual reality (virtual reality, VR) device, a vehicle-mounted device, a smart car, a smart speaker, a robot, smart glasses, or the like.

An embodiment of this application further provides a computer-readable storage medium, storing a computer program, where the computer program, when run on a computer, causes the computer to perform the notification processing method in the foregoing embodiments.

All or some of the foregoing embodiments may be implemented by using software, hardware, firmware, or any combination thereof. When the embodiments are implemented by using software, all or some of the embodiments may be implemented in a form of a computer program product. The computer program product includes one or more computer instructions. When the computer program instructions are loaded and executed on a computer, all or some of the procedures or functions described in this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (Solid State Disk)), or the like.

In the embodiments of this application, "at least one" means one or more, and "a plurality of" means two or more. A term "and/or" describes an association relationship between associated objects and indicates that three relationships may exist. For example, A and/or B may indicate the following three cases: Only A exists, both A and B exist, and only B exists, where A and B may be singular or plural. The character "/" usually indicates an "or" relationship between associated objects. "At least one of the following items" and a similar expression thereof refer to any combination of these items, including a single item or any combination of plural items. For example, at least one of a, b, and c may indicate a, b, c, a and b, a and c, b and c, or a, b, and c, where a, b, and c may be singular or plural.

The foregoing descriptions are merely exemplary embodiments of this application, but are not intended to limit this application. For a person skilled in the art, various modifications and variations may be made to this application. Any modification, equivalent replacement, or improvement made without departing from the spirit and principle of this application shall fall within the protection scope of this application.

What is claimed is:

1. A method, comprising:
   displaying a window notification mode selection interface in a display screen, wherein the window notification mode selection interface comprises a first mode option and a second mode option;
   selecting a current notification display mode, wherein the current notification display mode comprises a first mode in response to selection of the first mode option or wherein the current notification display mode comprises a second mode in response to selection of the second mode option;
   displaying a first window in a first region of the display screen and a second window in a second region of the display screen; and
   popping up, in response to a preset operation on the first window, a first notification bar corresponding to the first window, and displaying, in the first notification bar:
     when the current notification display mode comprises the first mode, at least a current notification message of the first window, or
     when the current notification display mode comprises the second mode, each notification message associated with each window of a current application corresponding to the first window, and
   wherein:
     when the current notification display mode comprises the first mode, any notification message that does not correspond to the first window is not displayed in the first notification bar; or
     when the current notification display mode comprises the second mode, any notification message that does not correspond to the current application corresponding to the first window is not displayed in the first notification bar.

2. The method according to claim 1, wherein the display screen displays a status bar outside the first window and the second window; and wherein the method further comprises:
popping up a third notification bar in response to the preset operation on the status bar, and displaying notification messages of all applications in the third notification bar.

3. The method according to claim 2, wherein each notification message in the first notification bar is completely displayed in the first notification bar, and at least one notification message in the third notification bar is incompletely displayed in the third notification bar.

4. The method according to claim 3, wherein displaying notification messages of all applications in the third notification bar comprises:
displaying, in the third notification bar, preview notification messages that belong to a same application, and in response to selection of the preview notification messages, unfolding the preview notification messages to display a plurality of completely displayed notification messages.

5. The method according to claim 1, wherein popping up, in response to the preset operation on the first window, the first notification bar corresponding to the first window, and displaying, in the first notification bar comprises:
in response to an instruction generated for the preset operation on the first window, obtaining current information about the first window or information about the current application corresponding to the first window;
obtaining a window notification message set of a corresponding window based on the current information about the first window, or obtaining an application notification message set of a corresponding application based on the information about the current application corresponding to the first window; and
generating the first notification bar based on the window notification message set or the application notification message set, and displaying, in the first notification bar, at least the current notification message of the first window or each notification message associated with each window of the current application corresponding to the first window.

6. The method according to claim 1, wherein the preset operation is a slide-down gesture operation.

7. The method according to claim 1, wherein the current application corresponds to a plurality of windows, and the plurality of windows correspond to a plurality of notification messages.

8. A terminal, comprising:
at least one processor; and
at least one non-transitory memory, wherein the at least one non-transitory memory is configured to store at least one instruction, and the at least one instruction is loadable and executable by the at least one processor to implement:
displaying a window notification mode selection interface in a display screen, wherein the window notification mode selection interface comprises a first mode option and a second mode option;
selecting a current notification display mode, wherein the current notification display mode comprises a first mode in response to selection of the first mode option or wherein the current notification display mode comprises a second mode in response to selection of the second mode option;
displaying a first window and a second window in the display screen; and
popping up, in response to a preset operation on the first window, a first notification bar corresponding to the first window, and displaying, in the first notification bar:
when the current notification display mode comprises the first mode, at least a current notification message of the first window, or
when the current notification display mode comprises the second mode, each notification message associated with each window of a current application corresponding to the first window; and
wherein when the current notification display mode comprises the first mode, any notification message that does not correspond to the first window is not displayed in the first notification bar.

9. The terminal according to claim 8, wherein the display screen displays a status bar outside the first window and the second window; and
wherein the at least one instruction is further loadable and executable by the at least one processor to implement:
popping up a third notification bar in response to the preset operation on the status bar, and displaying notification messages of all applications in the third notification bar.

10. The terminal according to claim 9, wherein each notification message in the first notification bar is completely displayed in the first notification bar, and at least one notification message in the third notification bar is incompletely displayed in the third notification bar.

11. The terminal according to claim 10, wherein displaying notification messages of all applications in the third notification bar comprises:
displaying, in the third notification bar, preview notification messages that belong to a same application, and in response to selection of the preview notification messages, unfolding the preview notification messages to display a plurality of completely displayed notification messages.

12. The terminal according to claim 8, wherein popping up, in response to the preset operation on the first window, the first notification bar corresponding to the first window, and displaying, in the first notification bar comprises:
in response to an instruction generated for the preset operation on the first window, obtaining current information about the first window or information about the current application corresponding to the first window;
obtaining a window notification message set of a corresponding window based on the current information about the first window, or obtaining an application notification message set of a corresponding application based on the information about the current application corresponding to the first window; and
generating the first notification bar based on the window notification message set or the application notification message set, and displaying, in the first notification bar, at least the current notification message of the first window or each notification message associated with each window of the current application corresponding to the first window.

13. The terminal according to claim 8, wherein the current application corresponds to a plurality of windows, and the plurality of windows correspond to a plurality of notification messages.

14. A terminal, comprising:
at least one processor; and at least one non-transitory memory, wherein the at least one non-transitory memory is configured to store at least one instruction, and the at least one instruction is loadable and executable by the at least one processor to implement:
- displaying a window notification mode selection interface in a display screen, wherein the window notification mode selection interface comprises a first mode option and a second mode option;
- selecting a current notification display mode, wherein the current notification display mode comprises a first mode in response to selection of the first mode option or wherein the current notification display mode comprises a second mode in response to selection of the second mode option
- displaying a first window in a first region of the display screen and a second window in a second region of the display screen; and
- popping up, in response to a preset operation on the first window, a first notification bar corresponding to the first window, and displaying, in the first notification bar:
  - when the current notification display mode comprises the first mode, at least a current notification message of the first window, or
  - when the current notification display mode comprises the second mode, each notification message associated with each window of a current application corresponding to the first window; and
- wherein when the current notification display mode comprises the second mode, any notification message that does not correspond to the current application corresponding to the first window is not displayed in the first notification bar.

15. The terminal according to claim 14, wherein the display screen displays a status bar outside the first window and the second window; and
- wherein the at least one instruction is further loadable and executable by the at least one processor to implement:
  - popping up a third notification bar in response to the preset operation on the status bar, and displaying notification messages of all applications in the third notification bar.

16. The terminal according to claim 15, wherein each notification message in the first notification bar is completely displayed in the first notification bar, and at least one notification message in the third notification bar is incompletely displayed in the third notification bar.

17. The terminal according to claim 16, wherein displaying notification messages of all applications in the third notification bar comprises:
- displaying, in the third notification bar, preview notification messages that belong to a same application, and in response to selection of the preview notification messages, unfolding the preview notification messages to display a plurality of completely displayed notification messages.

18. The terminal according to claim 14, wherein popping up, in response to the preset operation on the first window, the first notification bar corresponding to the first window, and displaying, in the first notification bar comprises:
- in response to an instruction generated for the preset operation on the first window, obtaining current information about the first window or information about the current application corresponding to the first window;
- obtaining a window notification message set of a corresponding window based on the current information about the first window, or obtaining an application notification message set of a corresponding application based on the information about the current application corresponding to the first window; and
- generating the first notification bar based on the window notification message set or the application notification message set, and displaying, in the first notification bar, at least the current notification message of the first window or each notification message associated with each window of the current application corresponding to the first window.

19. The terminal according to claim 14, wherein the current application corresponds to a plurality of windows, and the plurality of windows correspond to a plurality of notification messages.

* * * * *